(12) United States Patent
Anderson et al.

(10) Patent No.: US 6,822,674 B2
(45) Date of Patent: Nov. 23, 2004

(54) SCANNING METHOD AND APPARATUS FOR PHOTOGRAPHIC MEDIA

(75) Inventors: James M. Anderson, Lake Elmo, MN (US); Dennis A. Deutsch, Hastings, MN (US); John P. Peck, Minneapolis, MN (US); Vlado Kecman, Minneapolis, MN (US)

(73) Assignee: Eastman Kodak Company, Rochester, NY (US)

( * ) Notice: Subject to any disclaimer, the term of this patent is extended or adjusted under 35 U.S.C. 154(b) by 43 days.

(21) Appl. No.: 10/247,943

(22) Filed: Sep. 20, 2002

(65) Prior Publication Data

US 2004/0056951 A1 Mar. 25, 2004

(51) Int. Cl.⁷ .............................................. H04N 9/47
(52) U.S. Cl. ...................... 348/96; 226/58; 358/498
(58) Field of Search .................. 348/96–100, 102–103, 348/105–106, 108; 382/184, 193, 194, 199; 352/221, 223–224, 188; 226/87–88, 58; 358/493–498, 474; 271/3.15, 3.17, 258.01, 259, 265.02, 176

(56) References Cited

U.S. PATENT DOCUMENTS

| | | | | |
|---|---|---|---|---|
| 4,825,248 A | * | 4/1989 | Honjo et al. ................. 399/370 |
| 4,903,064 A | * | 2/1990 | Kogane et al. ............. 396/616 |
| 5,065,173 A | * | 11/1991 | Samuels et al. ............ 396/578 |
| 5,101,284 A | * | 3/1992 | Tanabe ....................... 358/461 |
| 5,211,385 A | * | 5/1993 | Hoorn ....................... 271/3.12 |
| 5,289,232 A | * | 2/1994 | Seto ............................ 355/75 |
| 5,400,096 A | * | 3/1995 | Kamada et al. ............. 396/324 |
| 5,461,492 A | * | 10/1995 | Jones ......................... 358/487 |
| 5,739,653 A | * | 4/1998 | Coy ........................... 318/560 |
| 5,872,591 A | | 2/1999 | Truc et al. |
| 6,037,974 A | | 3/2000 | Truc et al. |
| 2002/0109777 A1 | * | 8/2002 | Huang et al. ................ 348/96 |

\* cited by examiner

*Primary Examiner*—Chris Kelley
*Assistant Examiner*—David Czekaj
(74) *Attorney, Agent, or Firm*—David A. Novais

(57) ABSTRACT

The present invention relates to a scanner and a method of conveying and scanning photographic media. In the invention, an entrance roller pair and an exit roller pair are used to convey the photographic media thorough the scanner. The entrance roller pair and the exit roller pair each include idler rollers that can be selective moved toward their respective drive rollers and away from their respective drive rollers so as to selectively provide for an engaged or a disengaged position for each of the entrance roller pair and the exit roller pair. With the system of the present invention it is possible to lift the idler rollers before the leading and trailing edges of the media passes over the respective drive rollers to thus minimize any disturbance of media motion during scanning.

12 Claims, 6 Drawing Sheets

SCANNING METHOD AND APPARATUS FOR PHOTOGRAPHIC MEDIA

FIELD OF THE INVENTION

The present invention relates to a method of conveying and scanning photographic media, as well as a scanning apparatus which is adapted to scan photographic media.

BACKGROUND OF THE INVENTION

A typical film scanner continuously scans film as it moves at a constant velocity through a film gate. In order to drive the film through the scanner as well as the film gate, conventional scanners use an arrangement of idler rollers and drive rollers which are operable to drive the film. The idler rollers and drive rollers form a nip therebetween through which the film is passed, grip the film and move it through the film gate. During this process and especially during the conveyance of the film, the idler and drive rollers tend to cause a disturbance of the film motion. That is, the idler and drive rollers may cause the film to bounce around in a number of directions. This film motion disturbance can result in a misregistration of the film at the film gate which can adversely affect image quality. More specifically, the leading and trailing edges of the film cause a disturbance in the film motion as they pass through the nip rollers which adversely affects image quality during scanning.

SUMMARY OF THE INVENTION

The present invention provides for a method of conveying and scanning photographic media, as well as a scanning apparatus which overcome the image quality drawbacks of conventional scanners as discussed above. In a first feature of the present invention, an arrangement is provided in which an idler roller of an idler roller and drive roller pair is lifted from the drive roller before the leading and trailing edges of the film passes over the drive roller, to thus minimize any disturbance of the film motion and therefore improve the image quality.

In a further feature of the invention, a continuous cam is used as a mechanism for lifting the idler roller from the drive roller.

In a still further feature of the invention, side plates are used to precisely position film within an optical path for proper scanning. The side plates can be adjustable to accommodate films of different widths and are adjusted by way of a lead screw. In this further feature of the present invention, a coupler with linear play is used to couple a drive means which has a motor to the lead screw. The coupling permits the lead screw to keep turning when one side plate hits a stop before the other side plate, so that the lead screw can move the other side plate to its intended position. With this arrangement, it is not necessary to precisely position the side plates during assembly of the scanner.

The present invention therefore provides for a method of conveying photographic media to be scanned through a scanner. The method comprises the steps of placing an entrance roller pair located at an entrance of the scanner in an engaged position and an exit roller pair located at an exit of the scanner in a disengaged position during an idle period of the scanner; maintaining the engaged position of the entrance roller pair and the disengaged position of the exit roller pair as a leading edge of photographic media in a media path of the scanner passes an entrance sensor, with the entrance sensor being located at an entrance of the scanner and upstream of the entrance roller pair with respect to a direction of travel of the media in the media path; maintaining the engaged position of the entrance roller pair and placing the exit roller pair in an engaged position when a leading edge of the media in the media path passes the exit sensor, with the exit sensor being located at the exit of the scanner and downstream of the exit roller pair with respect to the direction of travel of the media; and placing the entrance roller pair in a disengaged position and maintaining the engaged position of the exit roller pair when a trailing edge of the media reaches the entrance sensor.

The present invention further relates to a scanner that comprises a media path for photographic media to be scanned; an entrance sensor provided at an entrance of the scanner for sensing at least a leading edge or a trailing edge of photographic media as it travels along the media path; an entrance roller pair provided downstream of the first sensor with respect to a direction of travel of the media along the path, with the entrance roller pair comprising an entrance drive roller and an entrance idler roller which are in an engaged position during an idle state of the scanner; an exit roller pair provided downstream of the entrance roller pair with respect to the direction of travel, with the exit roller pair being located in a vicinity of an exit of the scanner, and the exit roller pair comprising an exit drive roller and an exit idler roller which are in a disengaged position during an idle state of the scanner; an exit sensor provided at the exit of the scanner for sensing at least the leading edge or the trailing edge of the media as it travels along the media path; and a controller adapted to receive signals from at least one of the entrance sensor and the exit sensor during a scanning of photographic media in the media path, to place the exit idler roller and the exit drive roller in an engaged position when the leading edge of the media passes the exit sensor and place the entrance idler roller and the entrance drive roller in a disengaged position when the trailing edge of the media passes the entrance sensor.

The present invention further relates to a scanner that comprises a media path for media to be scanned; and at least one roller pair comprising an idler roller and a drive roller for conveying media along the media path, with the idler roller being mounted on a rotatable continuous cam shaft. The continuous cam shaft is rotatable between at least a first position where the cam shaft moves the idler roller relative to the drive roller to form a nip with the drive roller for the passage of media therebetween, and a second position where the cam shaft moves the idler roller away from the drive roller so that only the drive roller contacts the media in the media path.

The present invention further relates to a scanner which comprises a media path for media to be scanned; at least one roller pair comprising an idler roller and a drive roller for conveying media along the media path; sensing means for sensing a passage of media along the media path; and moving means for moving the idler roller relative to the drive roller in response to a signal from the sensing means, with the moving means moving the idler roller relative to the drive roller between a first position in which the idler roller forms a nip with the drive roller and a second position in which the idler roller moves away from the drive roller.

DETAILED DESCRIPTION OF THE INVENTION

Figure 1:
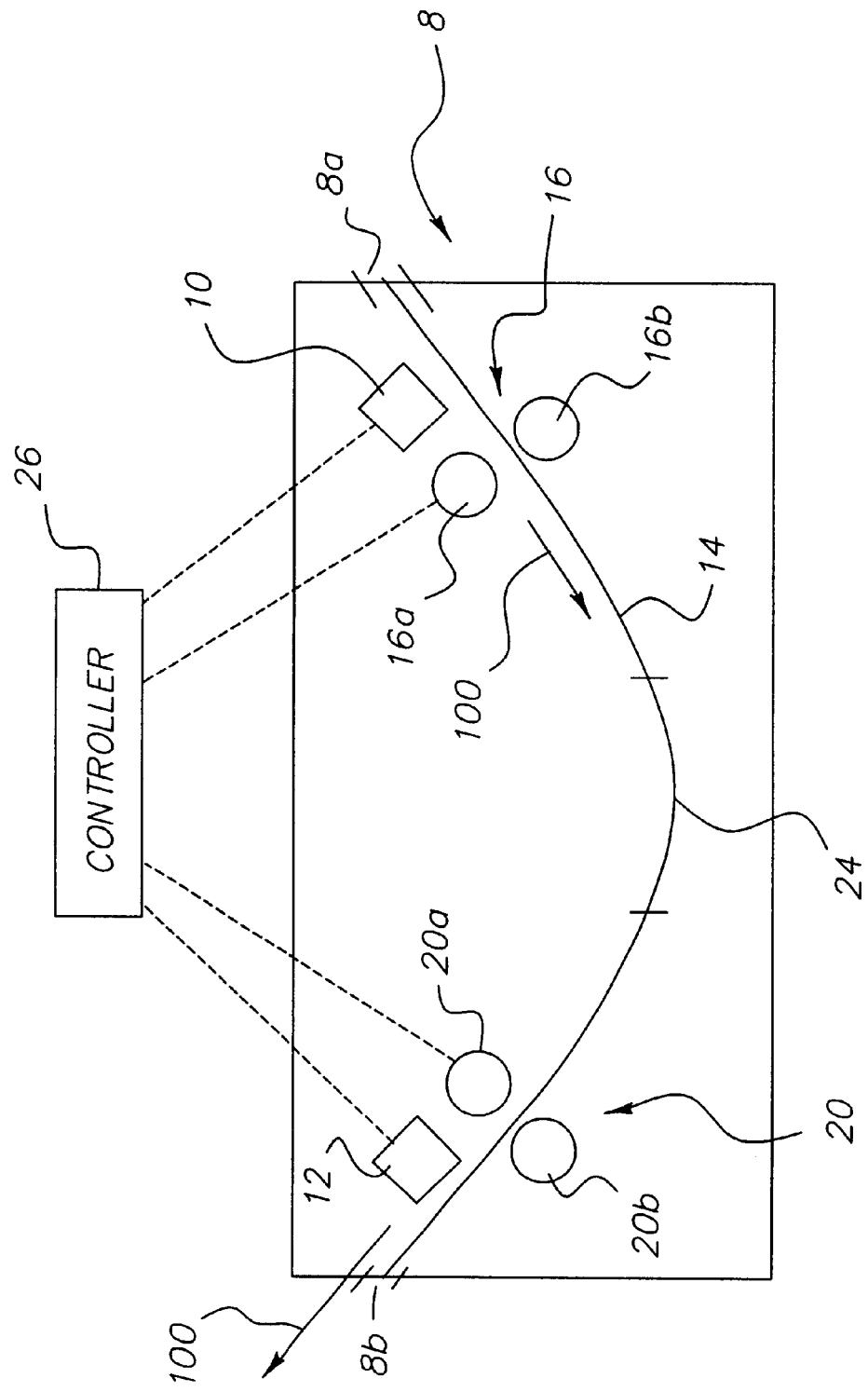
FIG. 1 is a schematic view of a scanner in accordance with the present invention, wherein the scanner includes adjustable entrance and exit idler and drive roller pairs.

Referring now to the drawings, wherein like reference numerals represent identical or corresponding parts throughout the several views, FIG. 1 is a schematic illustration of a scanner in accordance with the present invention. As shown in FIG. 1, scanner 8 is a scanner which scans photographic media such as photographic film, and more specifically, scans a strip of photographic film that contains multiple images, and creates a digital representation of those images. A typical scanner has a light source for illuminating the film as it passes through a film path, and has a film driving arrangement such as roller pairs that engage a strip of film and continuously advance the film. When the film comes between the light source and a light tunnel, light is projected through the film to thereby create an image of the film which is projected down the light tunnel. The scanner also includes a lens which focuses the projected image of the film onto a light sensor which receives the focused image of the film and outputs pixel data to a buffer. A computer can take the pixel data from the buffer and create a digital image of the film. A typical scanner as described above that can be utilized in the present invention is disclosed in U.S. Pat. Nos. 5,872,591 and 6,037,974, the context of which are herein incorporated by reference.

As shown in FIG. 1, scanner 8 includes a media entrance 8a and a media exit 8b with media path 14 extending therebetween. Positioned along media path 14 is a media gate or media scanning area schematically illustrated by reference numeral 24. Scanner 8 could be a scanner as illustrated in U.S. Pat. Nos. 5,872,591 and 6,037,974. However, the present invention is not limited to a scanner or a scanner as described in the above patents. It is recognized that the features of the present invention are applicable to other types of imaging apparatuses in which media is scanned or passes through a scanning location.

At entrance 8a there is located an entrance sensor 10, while an exit sensor 12 is located at exit 8b. The sensors can be known sensors, such as but not limited to, optical sensors, which can detect the leading and trailing edges of photographic media as the media passes by or reaches the sensors. For example, the sensors can be light emitting and light receiving diodes which recognize media as it passes through media path 14. Scanner 8 further includes an entrance roller pair 16 which comprises an entrance idler roller 16a and an entrance drive roller 16b, and an exit roller pair 20 which includes an exit idler roller 20a and exit drive roller 20b. Idler rollers 16a and 20a can be known rollers which are freely rotatable, while drive rollers 16b and 20b can each be associated with a drive means such as a motor to rotate the rollers 16b and 20b. It is further noted that entrance roller pair 16 is located downstream of entrance sensor 10 with respect to a direction of travel 14 of photographic media along media path 100, while exit roller pair 20 is located upstream of exit sensor 12 with respect to direction of travel 100.

Entrance idler roller 16a and entrance drive roller 16b form a nip for the passage of photographic media therebetween. Thus, as media is introduced into path 14 by way of entrance 8a, it will be conveyed by way of entrance idler roller 16a and entrance drive roller 16b along film path 14 to media gate 24 and to exit idler roller 20a and exit drive roller 20b, which transport the photographic media through exit 8b. Like rollers 16a and 16b, rollers 20a and 20b form a nip for the passage of media therebetween. As the photographic media is transported along media path 14, it is imaged at a media gate or media scanning area 24 as schematically illustrated in FIG. 1. It is preferred that the media move at a constant velocity through media gate 24.

In a feature of the present invention, entrance idler roller 16a of entrance roller pair 16 and exit idler roller 20a of exit roller pair 20 are adjustable in accordance with the passage of media therethrough. For this purpose, a controller or CPU 26 which is operatedly associated with entrance roller pair 16, exit roller pair 20, entrance sensor 10 and exit sensor 12 is used to control an engaged or disengaged position or state of the entrance roller pair 16 and exit roller pair 20. More specifically, in a feature of the present invention, entrance idler roller 16a is adjustable relative to entrance drive roller 16b so as to move between an engaged position in which it is engaged with entrance drive roller 16b, and more specifically, is positioned relative to drive roller 16b to form a nip with drive roller 16b for the passage of photographic media therebetween; and a disengaged position in which idler roller 16a is moved away from entrance drive roller 16b so as to no longer form the nip. In the same fashion, exit idler roller 20a is adapted to be moved relative to exit drive roller 20b to an engaged position in which idler roller 20a and drive roller 20a for a nip for the passage of photographic media therebetween, and a disengaged position in which idler roller 20a is moved away from drive roller 20b to no longer form the nip. Movement of entrance idler roller 16a and exit idler roller 20a between the engaged and disengaged positions is controlled based on entrance sensor 10 and exit sensor 12 with respect to the passage of the media through path 14.

Therefore, an engaged state or position of entrance roller pair 16 is defined when idler roller 16a is moved relative to drive roller 16b to form a nip therebetween. In this position, idler roller 16a and driver roller 16b are adapted to grip the media therebetween for conveyance along media path 14. A disengaged state or position of entrance roller pair 16 is defined when idler roller 16a is moved relative to drive roller 16b so that it moves away from drive roller 16b. In this position, rollers 16a and 16b do not form a nip and do not grip the film. However, it is recognized that the media remains in contact with or on top of drive roller 16b.

An engaged state or position of exit roller pair 20 is defined when idler roller 20a is moved relative to drive roller 20b to form a nip therebetween. In this position, idler roller 20a and drive roller 20b are adapted to grip the media therebetween for conveyance along media path 14. A disengaged state or position of exit roller pair 20 is defined when idler roller 20a is moved relative to drive roller 20b so that it moves away from driver roller 20b. In this position, rollers 20a and 20b do not form a nip and do not grip the film. However, it is recognized that the media remains in contact with or on top of driver roller 20b.

In an idle, non-operating or stand-by state of scanner 8, entrance roller pair 16 is in the engaged state or position and exit roller pair 20 is in the disengaged state as defined above. When photographic media to be scanned is introduced into entrance 8a, and a leading edge of the photographic media in media path 14 passes entrance sensor 10, a signal indicative thereof is provided to controller 26 which controls the scanner in a manner in which the engaged position of entrance roller pair 16 and the disengaged position of exit roller pair 20 are maintained. When the leading edge of the photographic media in media path 14 passes exit sensor 12, a signal indicative thereof is provided to controller 26 to control exit roller pair 20 and entrance roller pair 16 in a manner in which the engaged position of entrance roller pair 16 is maintained, however, exit roller pair 20 is placed in an engaged position. Therefore, both entrance roller pair 16 and exit roller pair 20 are in an engaged position.

When the trailing edge of the media passes entrance sensor 10, controller 26 receives a signal indicative thereof to cause entrance roller pair 16 to be placed in a disengaged position, and maintain the engaged position of exit roller pair 20. As the trailing edge of the media passes exit sensor 12, controller 26 receives a signal indicative thereof and is operated to place entrance roller pair 16 in the engaged position and exit roller pair 20 in the disengaged position. This places the scanner back into an idle, non-operating or stand-by state for the next job.

An example of the above idler roller sensor operation is summarized in the following Table I

TABLE I

IDLER ROLLER/SENSOR OPERATION

|  | Entrance pressure roller | Exit pressure roller |
| --- | --- | --- |
| Waiting for film | Engage | Disengage |
| Lead edge of film passes entrance sensor | Engage | Disengage |
| Lead edge of film passes exit sensor | Engage | Engage |
| Trail edge of film passes entrance sensor | Disengage, paused, engage | Engage |
| Trail edge of film passes exit sensor | Engage | Disengage |

Therefore, with the arrangement as noted above, sensors 10 and 12 detect the leading and trailing edge of the photographic media being scanned and lift idler rollers 16a, 20a accordingly. The lifting of idler rollers 16a, 20a before the leading or trailing edges of the media passes minimizes disturbances to the media motion as the media passes media gate 24 and accordingly, minimizes any media misregistration during image scanning to provide for improved image quality.

As described above, an engaged position of the entrance roller 16 pair means that the entrance idler roller 16a is moved relative to entrance drive roller 16b in a manner in which entrance idler roller 16a is lowered towards film path 14, so as to form a nip with entrance drive roller 16b to grip media as it passes therebetween. In a disengaged position of entrance roller pair 16, entrance idler roller 16a is moved away from entrance drive roller 16b to no longer form the nip.

An engaged position of exit roller pair 20 means that exit idler roller 20a is moved relative to exit drive roller 20b toward film path 14 to form a nip with drive roller 20b so as to grip media which passes therebetween. A disengaged position of exit roller pair 20 means that idler roller 20a is moved away from drive roller 20a to no longer form the nip.

Within the context of the present invention, entrance idler roller 16a and exit idler roller 20a can be moved by way of a pneumatic arrangement, a gear drive or any other type of device which can achieve this movement; while entrance drive roller 16b and exit drive roller 20b are preferably driven by way of a motor.

Figure 2:
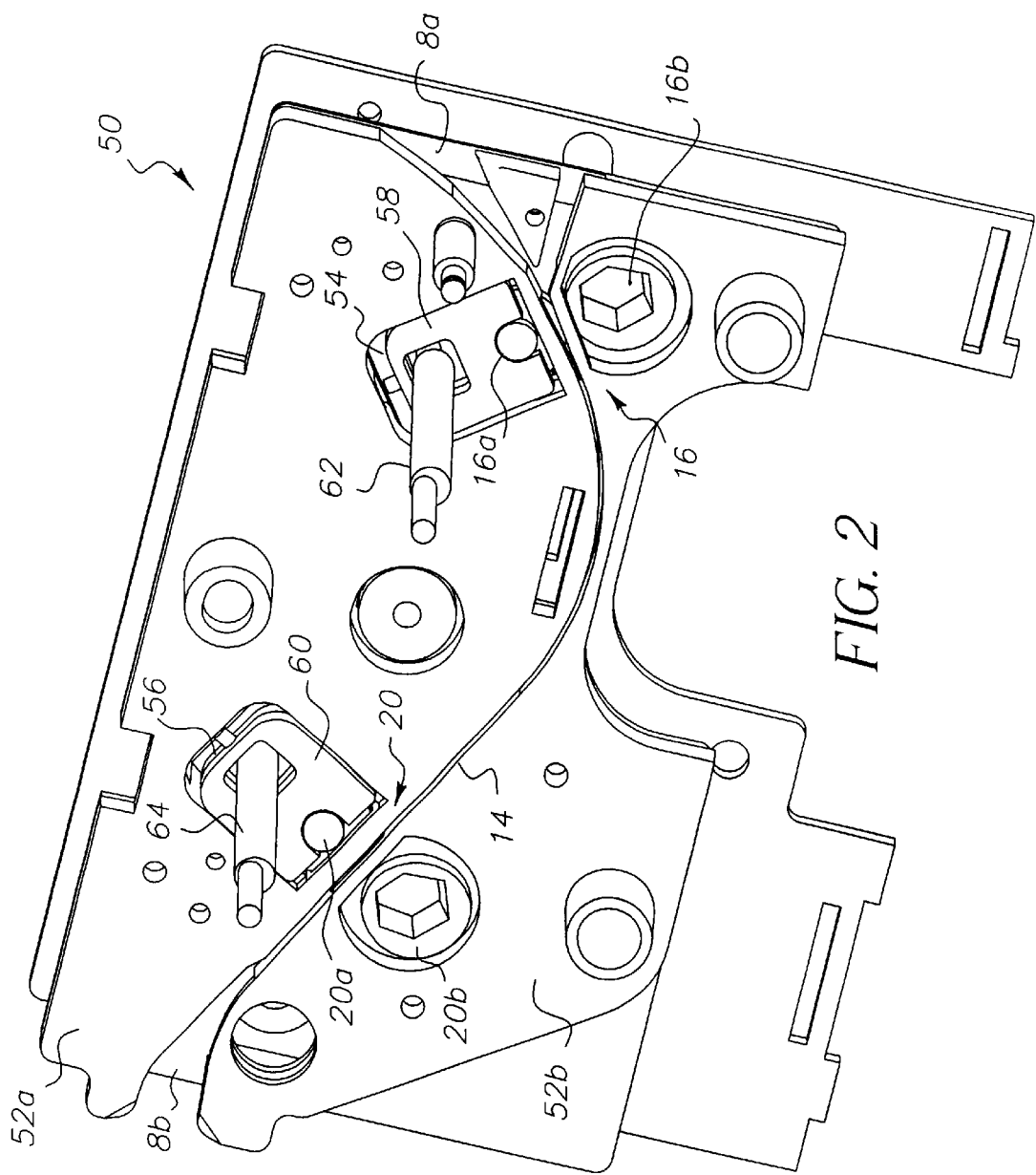
FIG. 2 is a view of the interior of the scanner in accordance with the present invention, showing a continuous cam arrangement for adjusting the position of the idler rollers, wherein the roller pairs are in an engaged position.

In a preferred feature of the present invention, entrance idler roller 16a and exit idler roller 20a are moved by way of a continuous cam the specifics which will be described with reference to FIGS. 2 and 3. As shown in FIG. 2, scanner 8 of the present invention includes a first side plate 50 onto which is mounted members 52a and 52b which define a portion of media path 14 therebetween. Within member 52a is provided an opening 54 within which a first idler roller holder 58 is provided. As shown in FIG. 2, opening 54 is slightly larger than idler roller holder 58 so as to permit a movement of idler roller holder 58 within the area defined by opening 54. Idler roller holder 58 includes a bore which rotatably receives a rotatable continuous cam shaft 62. Idler roller holder 58 also rotatably holds entrance idler roller 16a relative to entrance drive roller 16b. As shown in FIG. 2, entrance drive roller 16b is mounted within member 52b.

Exit roller pair 20 as shown in FIG. 2 essentially includes the same structure as described with respect to entrance roller pair 16. More specifically, in the area of exit roller pair 20, there is an opening 56, into which is received an idler roller holder 60. Idler roller holder 60 includes a bore which supports a rotatable continuous cam shaft 64. Idler roller holder 60 further rotatably supports exit idler roller 20a relative to drive roller 20b as shown. Drive roller 20b is positioned within member 52b as shown in FIG. 2.

FIG. 2 illustrates the entrance roller pair 16 and exit roller pair 20 in an engaged position wherein the respective idler rollers 16a and 20a are respectively positioned relative to drive rollers 16b and 20b so as to form a nip and thereby permit a gripping of photographic media which passes through film path 14.

Figure 3:
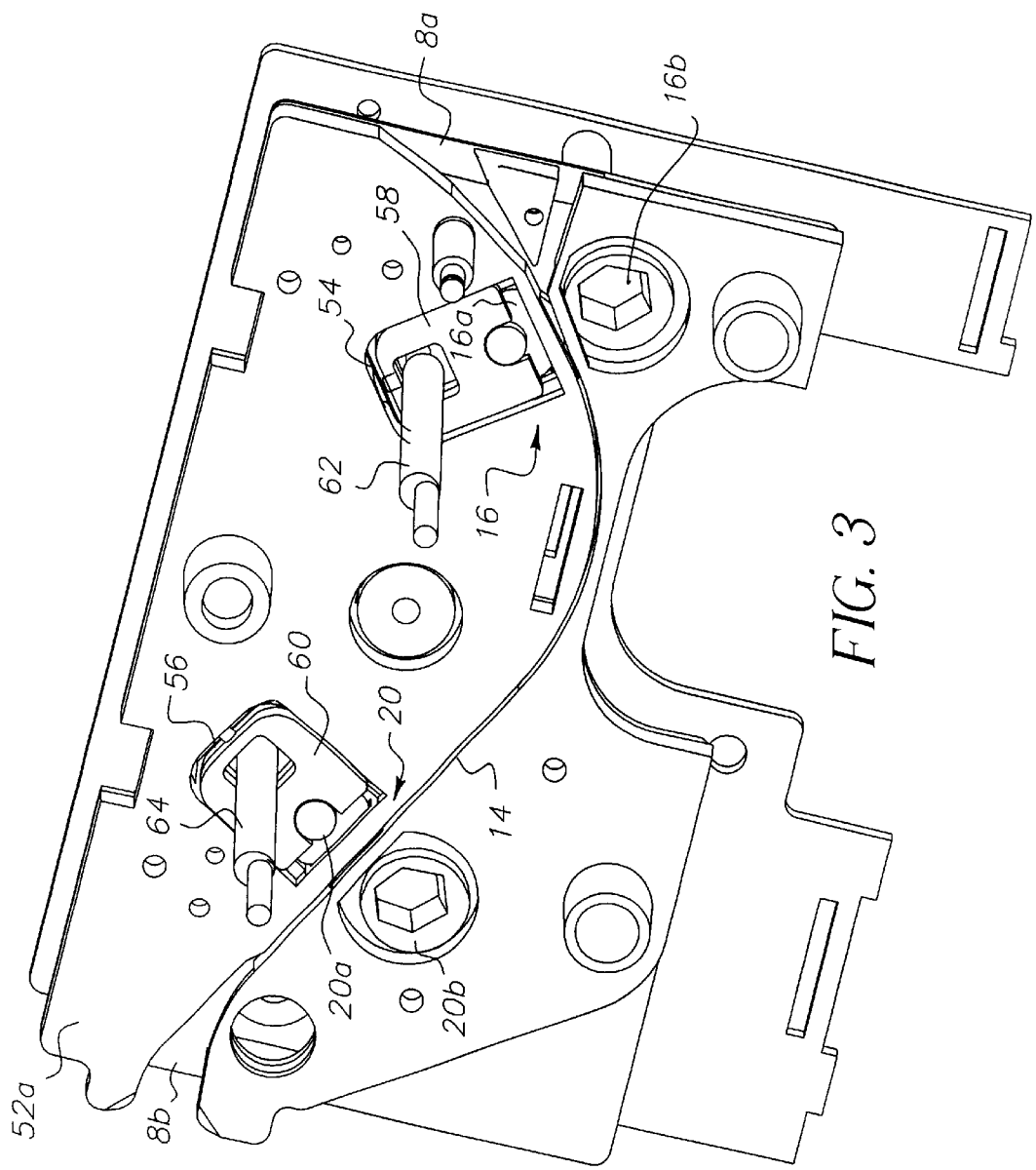
FIG. 3 is a view similar to FIG. 2, wherein the continuous cam positions the roller pairs in a disengaged position.

FIG. 3 also shows side plate 50 of scanner 8 in a manner similar to FIG. 2. The difference between FIG. 2 and FIG. 3 is that in FIG. 3, entrance roller pair 16 and exit roller pair 20 are in a disengaged position wherein idler rollers 16a, 20a are respectively moved away from drive rollers 20a, 20b so that no nip is formed therebetween and thereby, only drive rollers 16b, 20b contact the photographic media in media path 14.

With the arrangement illustrated in FIGS. 2 and 3, idler rollers 16a and 16b are moved in response to rotation of continuous cam shafts 62 and 64. More specifically, in order to place entrance roller pair 16 and exit roller pair 20 in the engaged state or position, each of rotatable shafts 62 and 64 are rotated to the position shown in FIG. 2 to move the respective idler roller holders 58 and 60 to a lower position within respective openings 54 and 56 as shown in FIG. 2. Therefore, due to the structure of continuous cam shafts 62 and 64, rotation of cam shafts 62, 64 respectively move each of idler roller holder 58 and 60 to the position illustrated in FIG. 2 and more specifically, to a lower position within respective openings 54 and 56. This permits a nip to be formed between rollers 16a and 16b, as well as rollers 20a and 20b.

For the purposes of placing each of entrance roller pair 16 and exit roller pair 20 in a disengaged state or position, continuous cam shafts 62, 64 are rotated to the position illustrated in FIG. 3. This causes each of the idler roller holder 58 and 60 to move upwardly within respective opening 54 and 56 to move the idler rollers 16a and 20a away from drive rollers 16b and 20b so as to no longer form a nip therebetween.

During operation of the scanner as previously described, each of cam shafts 62, 64 can be controllably rotated based on instructions from controller 26 which receives signals from entrance and exit sensors 10 and 12, so as to selectively move each of idler roller holders 58, 60 and thereby each of idler rollers 16a, 20a to either the engaged or disengaged positions depending on the position of the leading and trailing edges of the media. Rotation of cam shafts 62, 64 can be achieved through a motor coupled to each of the shafts.

Figure 4:
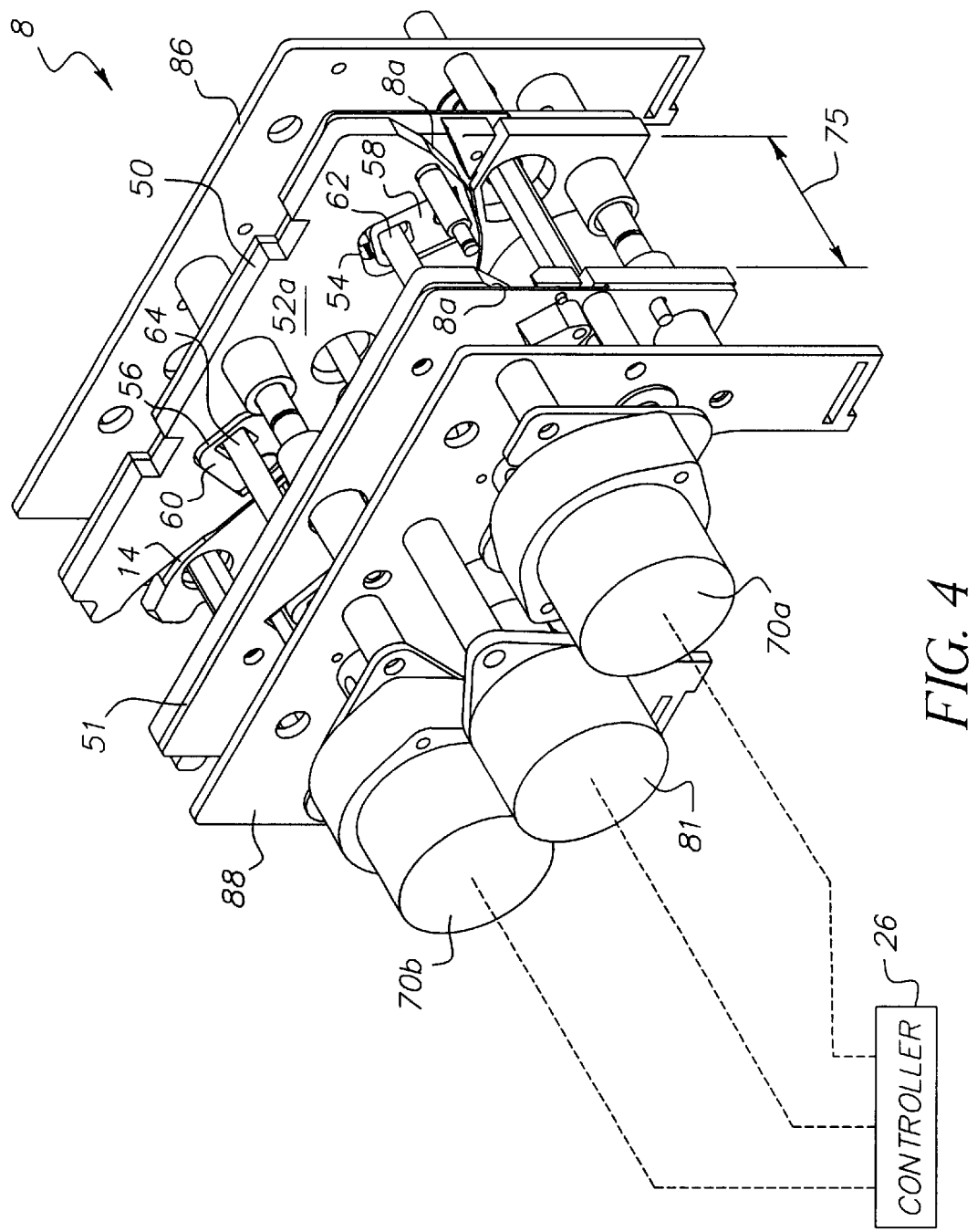
FIG. 4 is a view of the interior of the scanner of the present invention showing side plates which define a widthwise dimension of a media path.

With reference to FIG. 4, a drive means for rotating each of cam shafts 62 and 64 is shown. More specifically, in order to drive cam shafts 62 and 64, motor 70a and motor 70b can be coupled to each of shafts 62 and 64. Therefore, based on instructions from controller 26 with respect to the positioning of the leading and trailing edges of the photographic media, each of motors 70a and 70b can be controlled to place cam shafts 62 or 64 in either the engaged position as shown in FIG. 2 or the disengaged as shown in FIG. 3. Of course, it is recognized that FIGS. 2 and 3 only show one state of the positioning of the entrance roller pair 16 and the exit roller pair 20 with respect to each other, and it is recognized that the present invention includes operating states in which one of the entrance roller pair and exit roller pair is in an engaged position, while the other of the entrance roller pair and the exit roller pair is in a disengaged position. This positioning is based on where the leading and trailing edges of the media are as communicated by the entrance and exit sensors to the controller. Further, although two motors 70a, 70b are shown, it is recognized that shafts 62 and 64 can be driven by a single motor coupled to a gear train.

As also shown in FIG. 4, scanner 8 includes a second side plate 51 which includes the same structure as first side plate 50 except that it would be on the second or opposite side of the scanner. More specifically, second side plate 51 ould be identical to first side plate 50 and, thus, would include the noted entrance and exit idler roller holders, as well as the entrance and exit idler rollers and drive rollers. Further, cam shafts 62 and 64 would comprise the continuous cam as shown in FIG. 2 which would extend into the associated entrance and exit idler roller holders in side plate 51. Thus, with the arrangement of the present invention, the rotation of continuous cam shafts 62 and 64 will move each of the entrance and exit idler rollers which are positioned on each side of width 75 of path 14 by the same amount. More specifically, because of continuous cam shafts 62 and 64, the idler rollers which are mounted within side plate 50 would move the same amount as the idler rollers which are mounted on the same cam shafts within side plate 51, when cam shafts 62 and 64 are rotated. As shown in FIG. 4, controller 26 which receives signals from sensor 10, 12 (FIG. 1) can be operationally associated with motors 70a and 70b to controllably rotate cam shafts 62 and 64 and cause the corresponding movement of idler rollers 16a and 20a.

Figure 5:
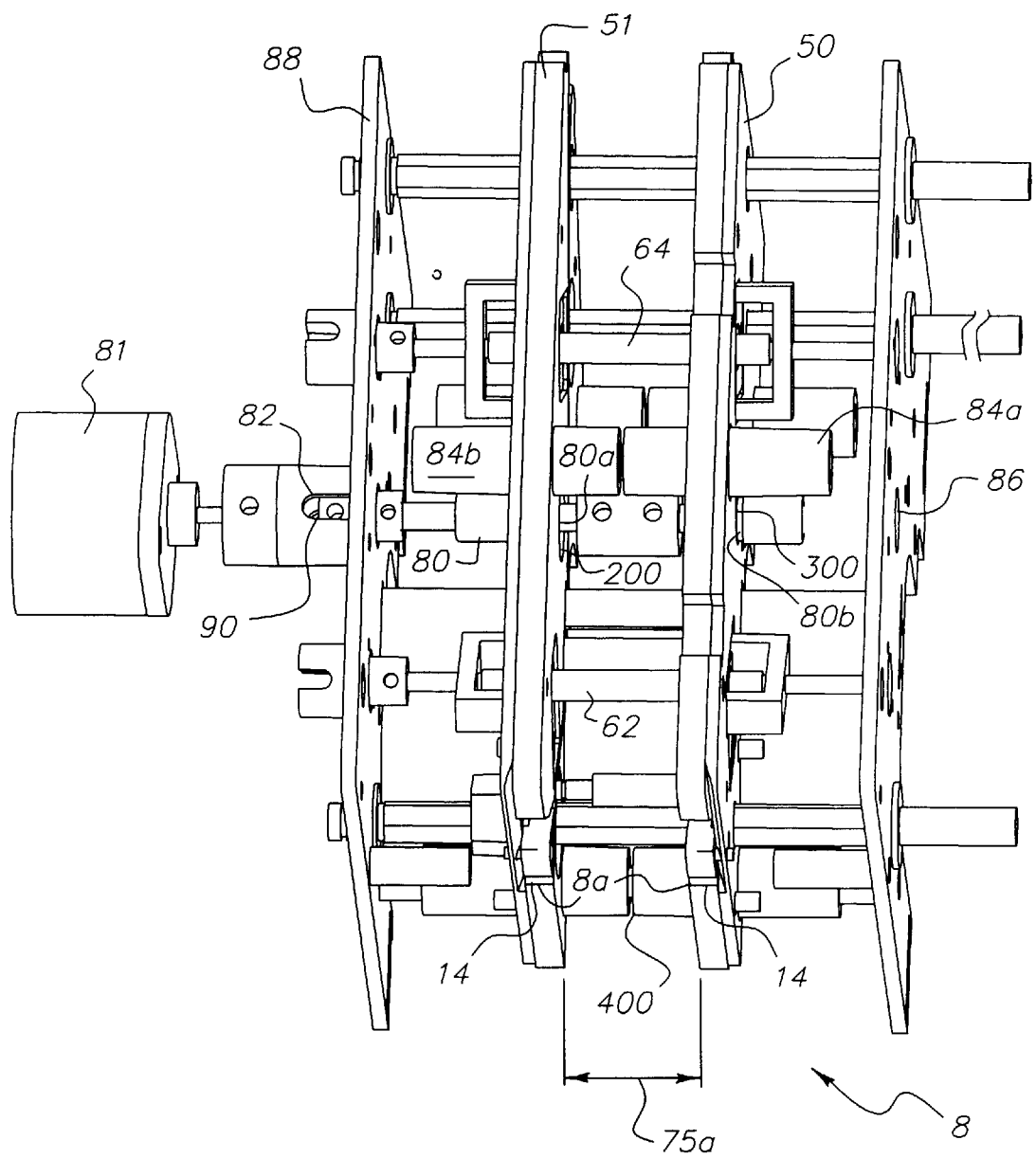
FIG. 5 is a further view of the interior of the scanner, wherein the side plates are moved to accommodate media of a first format.
Figure 6:
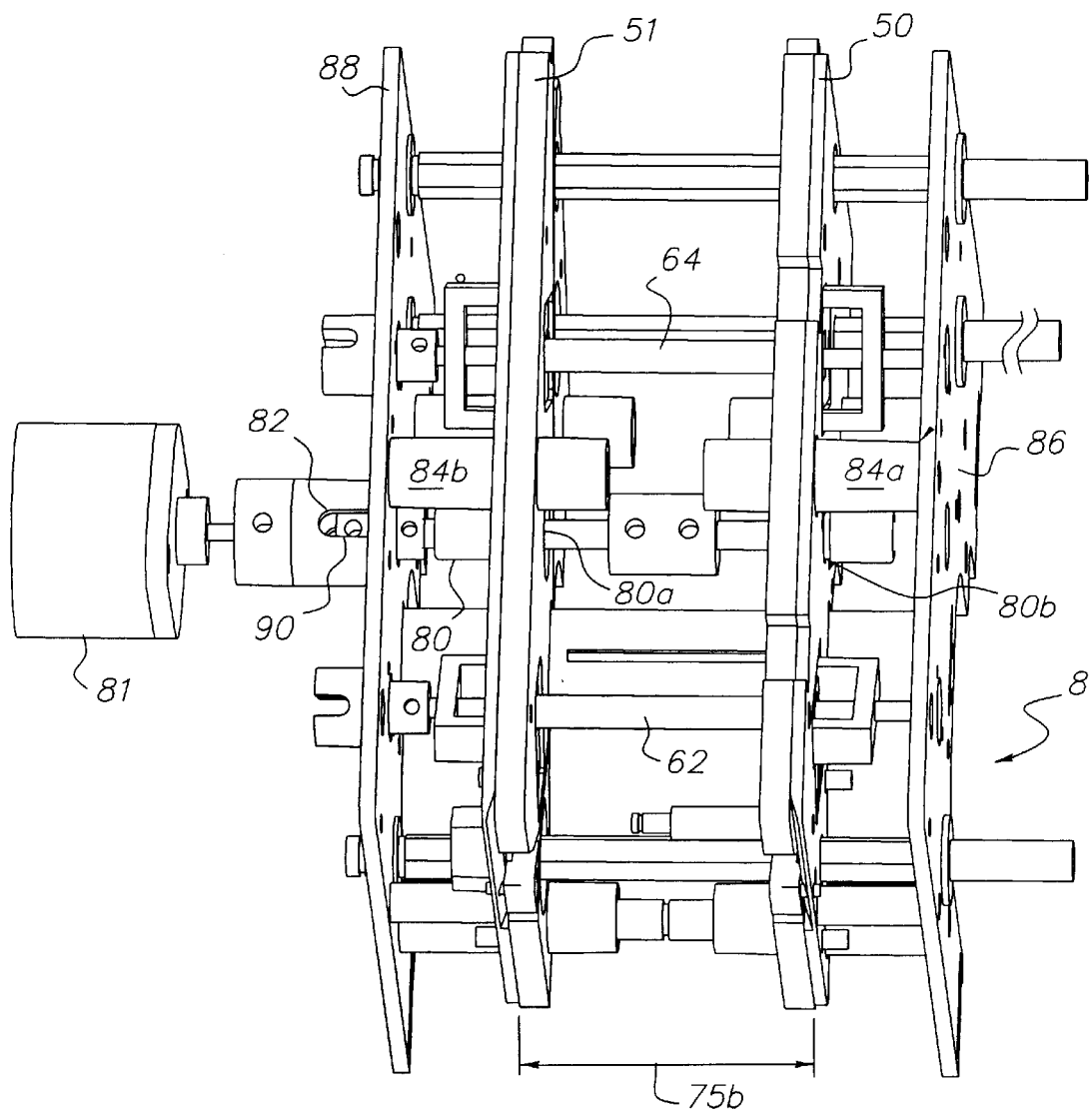
FIG. 6 is a further view of the interior of the scanner, wherein the side plates are moved to accommodate media of a second format.

A further feature of the present invention will be described with reference to FIGS. 5 and 6. More specifically, as shown in FIGS. 5 and 6, each of side plates 50 and 51 are movable toward and away from each other so as to accommodate photographic media of different widths. That is, as shown in FIG. 5, each of side plates 50 and 51 are movable toward each other so as to define a first width 75a therebetween so that media path 14 defines a path for photographic media of a first format and more specifically, a shorter width format such as APS film. Also, side plates 50 and 51 are movable away from each other so as to define a second width 75b therebetween as shown in FIG. 6. This provides for a media path 14 which is adapted to accommodate photographic media of a second format and, more specifically, a larger width format such as 35 mm film.

A mechanism for moving side plates 50 and 51 will now be described. As schematically shown in FIG. 5, a lead screw 80 is provided to extend between and through side plates 50 and 51. Lead screw 80 generally includes a first portion 80a that defines, for example, a left-hand thread, and a second portion 80b that defines, for example, a right-hand thread. Each of side plates 50 and 51 include bores 200, 300 through which lead screw 80 passes. Each of bores 200, 300 include corresponding threads which are respectively in mesh with the left-hand thread and the right-hand thread of lead screw 80. Coupled to lead screw 80 by way of a coupling 82 is a motor 81. As shown in FIG. 5, coupling 82 includes an extended aperture 90 into which an end of lead screw 80 is positioned. Aperture 90 provides a linear play for coupling 82. This permits lead screw 80 to keep on rotating when one of side plates 50 or 51 reaches a stop prior to the other of side plates 50 and 51. More specifically, as shown in FIG. 5, side plate 50 includes a stop 84a provided thereon, while side plate 51 includes a stop 84b provided there. Also shown in FIG. 5 are end plates 86 and 88. Therefore, in the position illustrated in FIG. 5 in which media of a first format such as APS film is to be scanned, motor 81 is rotated in a first direction so that side plates 50 and 51 are moved, due to the left-hand and right-hand threads of lead screw 80, toward each other until respective stops 84a and 84b abut against each other as shown in FIG. 5. This defines width 75a so as to provide for a path 14 of a first width and, more specifically, a path to convey media of a first format. When it is desired to scan photographic media of a second format and more specifically, a wider format media, motor 81 is rotated in a reverse direction. This causes side plates 50 and 51 to move away from each other, due to the left-hand thread and the right-hand thread of lead screw 80, to width 75b as shown in FIG. 6. That is, each of side plates 50 and 51 move towards respective end plates 86 and 88 and more specifically, side plates 50 and 51 move until respective stops 84a and 84b abut against end plates 86 and 88 so as to define the larger format path. As shown in FIG. 4, motor 81 can be associated with controller 26 to provide for an automated movement of side plates 50, 51 based on a signal from controller 26.

In the event that lead screw 80 is not precisely calibrated so as to cause one of stops 84a or 84b to reach the corresponding side plates 86 or 88 before the other, coupling 82 having a linear play defined by opening 90 permits lead screw 80 to continue rotating. For example, if in positioning side plates 50 and 51 for larger format media, side plate 51 hits end plate 88 and more specifically, stop 84b hits end plate 88 prior to stop 84a hitting end plate 86, it is possible that a misalignment of the optical path will occur and that path 14 may be too narrow for the photographic media to properly pass between side plates 50 and 51. One way to ensure that side plates 50 and 51 reach their intended position at the same time is to calibrate lead screw 80 and side plates 50 and 51 during assembly. This tends to add cost to the assembly and, further, even if calibrated, the lead screw and side plates may lose their calibration during extended use.

With the arrangement of the present invention as illustrated in FIGS. 5 and 6, if one of side plates 50 and 51 hit end plates 86, 88 before the other of side plates 50 and 51, coupling 82 with linear play permits the lead screw to continue rotating within opening 90 as explained above. More specifically, assuming that stop 84b for side plate 51 hits end plate 88 prior to stop 84a of side plate 50 hitting end plate 86, motor 81 will continue to turn lead screw 80. By continuing to turn lead screw 80, lead screw 80 will continue rotating and move within area 90 due to the linear play. At this point, end plate 51 will be at its noted position due to the fact that stop 84b is abutting against end plate 88, however, right-hand thread 80b on rotating lead screw 80 will continue move side plate 50 in a direction toward end plate 86 until stop 84a hits end plate 86 so as provide for the preferred width 75b as shown in FIG. 6.

Therefore, by having motor 81 with linear coupling 82 as shown, it is not necessary to precisely calibrate lead screw 80 with side plates 50 and 51 to assure the proper positioning of side plates 50 and 51 for different format film. Motor 81 with coupling 82 having linear play as shown in FIGS. 5 and 6 will assure that lead screw 80 will continue rotating if one side plate hits the end plate before the other one, so as to permit the other side plate to reach its associated end plate. The above also applies when moving side plates 50 and 51 to the shorter width position of FIG. 5. More specifically, an inner stop position 400 can be established as shown in FIG. 5, so that if one plate reaches the intended position prior to the other, lead screw 80 will continue rotating due to the linear play to move the other side plate to the intended position.

Further, continuous cam shafts 62, 64 as described with reference to FIGS. 2 and 3 span the widest format media used and the idler roller holders are designed to slide along the continuous cam shafts as the side plates are moved to the proper position. This assures that idler rollers 16a, 20a at the widthwise ends of path 14 move the same amount regardless of the position of side plates 50 and 51. More specifically, by having continuous cam shafts 62, 64 extend through from side plate 50 and side plate 51, it is assured that the idler rollers in side plate 50 and the idler rollers in side plate 51 move the same amount. That is, it is assured that both of the idler rollers mounted on a single cam shaft move the same amount regardless of their position along the cam to assure consistent movement of media through the scanner.

Further, although APS and 35 mm format film have been described, it is recognized that the present invention is not limited thereto. It is noted that side plates 50 and 51 can be moved to several positions so as to define various widths for conveying film of multiple formats other than 35 and APS.

The invention has been described in detail with particular reference to certain preferred embodiments thereof, but it will be understood that variations and modifications can be effected within the spirit and scope of the invention.

What is claimed is:

1. A method of conveying photographic media to be scanned through a scanner, the method comprising the steps of:
    placing an entrance roller pair located at an entrance of the scanner in an engaged position and an exit roller pair located at an exit of the scanner in a disengaged position during an idle period of the scanner;
    maintaining the engaged position of the entrance roller pair and the disengaged position of the exit roller pair when a leading edge of photographic media in a media path of the scanner passes an entrance sensor, the entrance sensor being located at an entrance of the scanner and upstream of the entrance roller pair with respect to a direction of travel of the media in the media path;
    maintaining the engaged position of the entrance roller pair and placing the exit roller pair in an engaged position when a leading edge of the media in the media path passes an exit sensor, the exit sensor being located at the exit of the scanner and downstream of the exit roller pair with respect to the direction of travel of the media; and
    placing the entrance roller pair in a disengaged position and maintaining the engaged position of the exit roller pair when a trailing edge of the media passes the entrance sensor.

2. A method according to claim 1, further comprising:
    placing the entrance roller pair in the engaged position and the exit roller pair in the disengaged position when the trailing edge of the media passes the exit sensor.

3. A method according to claim 2, wherein:
    said entrance roller pair comprises an entrance drive roller and an entrance idler roller;
    said step of placing the entrance roller pair in the engaged position comprises placing the entrance drive roller and the entrance idler roller relative to each other so as to grip the media in the media path as the media passes between said entrance drive roller and said entrance idler roller; and
    said step of placing the entrance roller pair in the disengaged position comprises moving the entrance idler roller away from the entrance drive roller so that only the entrance drive roller contacts the media.

4. A method according to claim 2, wherein:
    said exit roller pair comprises an exit drive roller and an exit idler roller;
    said step of placing the exit roller pair in the engaged position comprises placing the exit drive roller and the exit idler roller relative to each other so as to grip the media in the media path as the media passes between said exit drive roller and said exit idler roller; and
    said step of placing the exit roller pair in the disengaged position comprises moving the exit idler roller away from the exit drive roller so that only the exit drive roller contacts the media.

5. A method according to claim 1, wherein said media is photographic film.

6. A scanner comprising:
    a media path for photographic media to be scanned;
    an entrance sensor provided at an entrance of the scanner for sensing at least a leading or a trailing edge of media at it travels along the media path;
    an entrance roller pair provided downstream of said first sensor with respect to a direction of travel of the media along the media path, said entrance roller pair comprising an entrance drive roller and an entrance idler roller which are in an engaged position during an idle state of said scanner;
    an exit roller pair provided downstream of said entrance roller pair with respect to said direction of travel, said exit roller pair being located in a vicinity of an exit from said scanner, said exit roller pair comprising an exit drive roller and an exit idler roller which are in a disengaged position during an idle state of said scanner;
    an exit sensor provided at the exit of the scanner for sensing at least the leading or the trailing edge of the media at it travels along the media path; and
    a controller adapted to receive signals from at least one of the entrance sensor and the exit sensor during a scanning of photographic media in said media path to place the exit idler roller and the exit drive roller in an engaged position when the leading edge of the media passes the exit sensor and place the entrance idler roller and the entrance drive roller in a disengaged position when the trailing edge of the media passes the entrance sensor.

7. A scanner according to claim 6, wherein:

said controller is further adapted to place the entrance idler roller and the entrance drive roller in the engaged position and place the exit idler roller and the exit drive roller in the disengaged position when the trailing edge of the media passes the exit sensor.

8. A scanner according to claim 6, wherein said media is film.

9. A scanner according to claim 6, wherein:

said entrance idler roller is rotatably mounted on an entrance idler roller holder and said exit idler roller is rotatably mounted on an exit idler roller holder;

said entrance idler roller holder is mounted on a first cam shaft which is rotatable to a first entrance idler roller holder position which moves the entrance idler roller so that said entrance idler roller and said entrance drive roller are in the engaged position, and to a second entrance idler roller holder position which moves the entrance idler roller so that said entrance idler roller and said entrance drive roller are in the disengaged position; and said exit idler roller holder is mounted on a second cam shaft which is rotatable to a first exit idler roller holder position which moves the exit idler roller so that said exit idler roller and said exit drive roller are in the engaged position, and to a second exit idler roller holder position which moves the exit idler roller so that said exit idler roller and said exit drive roller are in the disengaged position.

10. A scanner according to claim 6, further comprising:

first and second side plates which are movable between at least a first media path position to define a first path for media of a first format and a second media path position to define a second path for media of a second format.

11. A scanner according to claim 6, further comprising:

a lead screw which is adapted to move said first and second side plates between said first and second media path positions;

motor for driving said lead screw to move said side plates; and a coupling having linear play for coupling said motor to said lead screw.

12. A scanner according to claim 11, wherein said lead screw comprises a left hand thread for driving one of said first and second side plates in first direction and a right hand thread for driving the other of said first and second side plates in a second direction.

* * * * *